S. S. Gray.
Collar.
No. 1836.
Reissued. Dec. 20 1864.
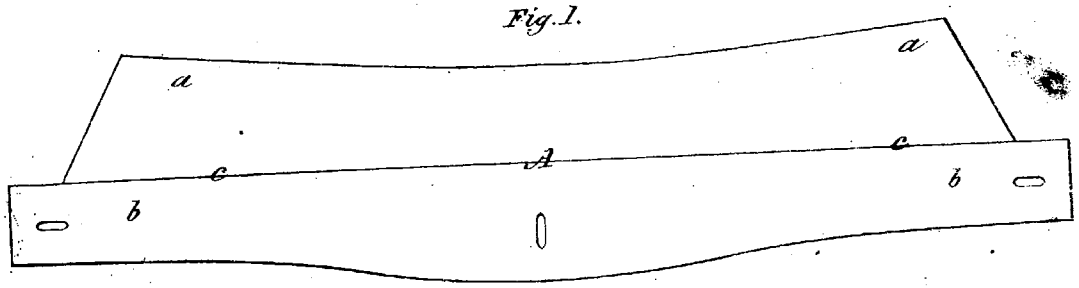
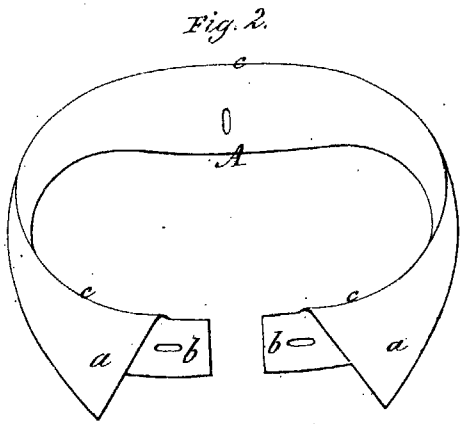
Witnesses.
Jno. D. Patten
F. W. Hilliam
Solomon S. Gray
By atty A. B. Stoughton.

UNITED STATES PATENT OFFICE.

SOLOMON S. GRAY, OF BOSTON, MASSACHUSETTS.

IMPROVEMENT IN APPARATUS FOR FORMING COLLARS.

Specification forming part of Letters Patent No. 43,401, dated July 5, 1864; Reissue No. 1,836, dated December 20, 1864.

DIVISION B.

*To all whom it may concern:*

Be it known that I, SOLOMON S. GRAY, of Boston, in the county of Suffolk and State of Massachusetts, have invented a new and useful Improvement in Paper, or in Paper and Cloth Combined, Shirt-Collars; and I do hereby declare the following to be a full, clear, and exact description of the same, reference being had to the accompanying drawings, making a part of this specification, in which—

Figure 1 represents a paper strip as cut out previous to turning over the upper upon the lower portion to form what is termed a "turn-over collar." Fig. 2 represents the turnover collar complete.

To turn over a paper, or a paper and cloth combined, strip or collar on a straight line without molding or stretching the upper portion of said strip causes the finished collar to pucker or wrinkle, more especially if a necktie be used. The object of my present invention is to obviate this difficulty; and my invention consists in molding or stretching the upper portion of the strip so that the collar may be turned over on a straight line and avoid the puckering and wrinkling incident to those thus turned over without the molding and stretching process.

To enable others skilled in the art to make and use my invention, I will proceed to describe the same with reference to the drawings.

A represents a paper, or a paper and cloth combined, strip or shirt-collar, of which the part *a* may be called the "upper" or "outer" portion when finished, and *b* the "band" or "neck" portion. To make a collar out of this strip that would fit the neck its under or band portion should be molded or stretched; but my present invention relates to a turn-over and not a stand-up collar.

Now, to turn the portion *a* over upon the portion *b*, on a straight line, *c*, without any molding or stretching of any portion of the strip would make a collar unpleasant and uncomfortable to wear, as, when bent around in the form it must be in when worn it will pucker and wrinkle, and more particularly so when a necktie is introduced between the turned-over and the band portion. I avoid all this by molding or stretching the upper portion, *a*, which, when thus treated, may be folded over on the straight line *c*, and the portion *a* will stand off from the portion *b*, as shown in Fig. 2, entirely avoiding all puckering or wrinkling and admitting a necktie between the folded-over and the band portion.

Having described this part of my invention, what I claim under this patent as an article of manufacture is—

A paper, or a paper and cloth, collar having its upper or turned-over portion molded or stretched, substantially as and for the purpose herein set forth.

SOLOMON S. GRAY.

Witnesses:

A. B. STOUGHTON,

HAVER. FENDERICK.